United States Patent [19]
Henschke et al.

[11] 3,741,410
[45] June 26, 1973

[54] SEPARATOR

[75] Inventors: Ernest J. Henschke, Des Plaines;
George H. Logemann, Mundelein;
Stanley Moorad, Niles; Lino P. Savio,
Glenview, all of Ill.

[73] Assignee: Ekco Products, Inc., Wheeling, Ill.

[22] Filed: Mar. 24, 1971

[21] Appl. No.: 127,445

[52] U.S. Cl............... 214/8.5 K, 221/222, 221/297
[51] Int. Cl............................................. B65g 59/10
[58] Field of Search..................... 214/8.5 R, 8.5 A, 214/8.5 K, 8.5 H; 221/221, 222, 297, 251

[56] References Cited
UNITED STATES PATENTS

| | | | |
|---|---|---|---|
| 2,595,013 | 4/1952 | Smith | 214/8.5 K |
| 3,198,382 | 8/1965 | Cleary | 221/222 |
| 3,426,941 | 2/1969 | Hovekamp | 221/222 |
| 2,433,736 | 12/1947 | Carew | 214/8.5 K |
| 1,634,566 | 7/1927 | Wessman | 214/8.5 K |
| 3,104,780 | 9/1963 | Carter et al. | 221/251 X |
| 3,283,955 | 11/1966 | Crabtree | 221/251 |
| 2,659,522 | 11/1953 | Ninneman et al. | 221/222 X |
| 3,191,804 | 6/1965 | Amic, Sr. | 221/251 X |

FOREIGN PATENTS OR APPLICATIONS

| | | | |
|---|---|---|---|
| 889,085 | 9/1943 | France | 221/222 |
| 673,476 | 6/1952 | Great Britain | 214/8.5 K |
| 944,815 | 12/1963 | Great Britain | 221/222 |

*Primary Examiner*—Robert J. Spar
*Attorney*—Robert D. Teichert and Donald J. Koprowski

[57] ABSTRACT

A separator unit for sequentially denesting the lowermost container from an upright stack of nested-like containers, each having an outwardly projecting rim at the mouth thereof. The unit includes a first driven rotor with which the rim of the lowermost contaiker has downward engagement along the surface of a segmental ledge extending from the first rotor pending rotation of the rotor through an arc to withdraw the ledge from the rim, and a blade on a second rotor with which the rim of the lowermost container is engaged and gradually pushed downwardly to separate the lowermost container from the stack when the flange of the first rotor is withdrawn from engagement with the rim of the lowermost container. The second rotor is coupled to the first rotor for rotation in unison with the first rotor about a common axis while allowing the second rotor to have limited movement relative to the first rotor along the common axis.

8 Claims, 15 Drawing Figures

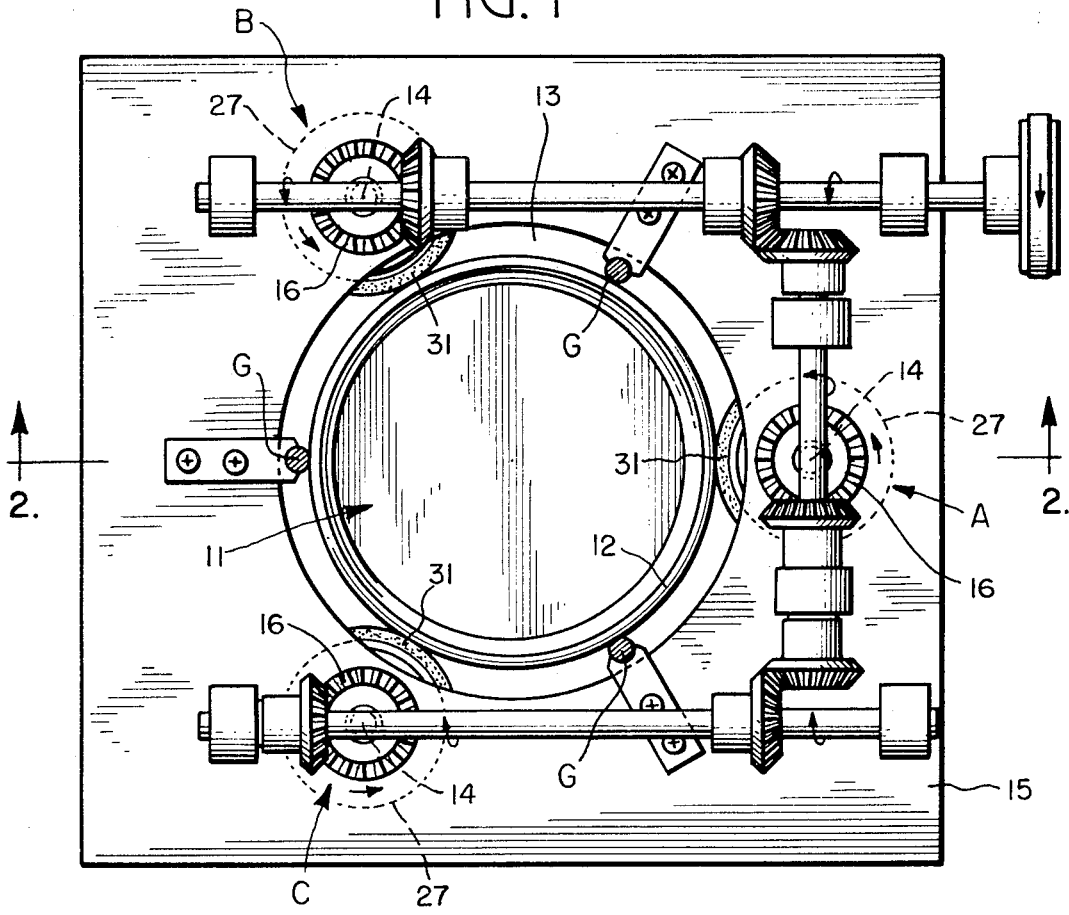
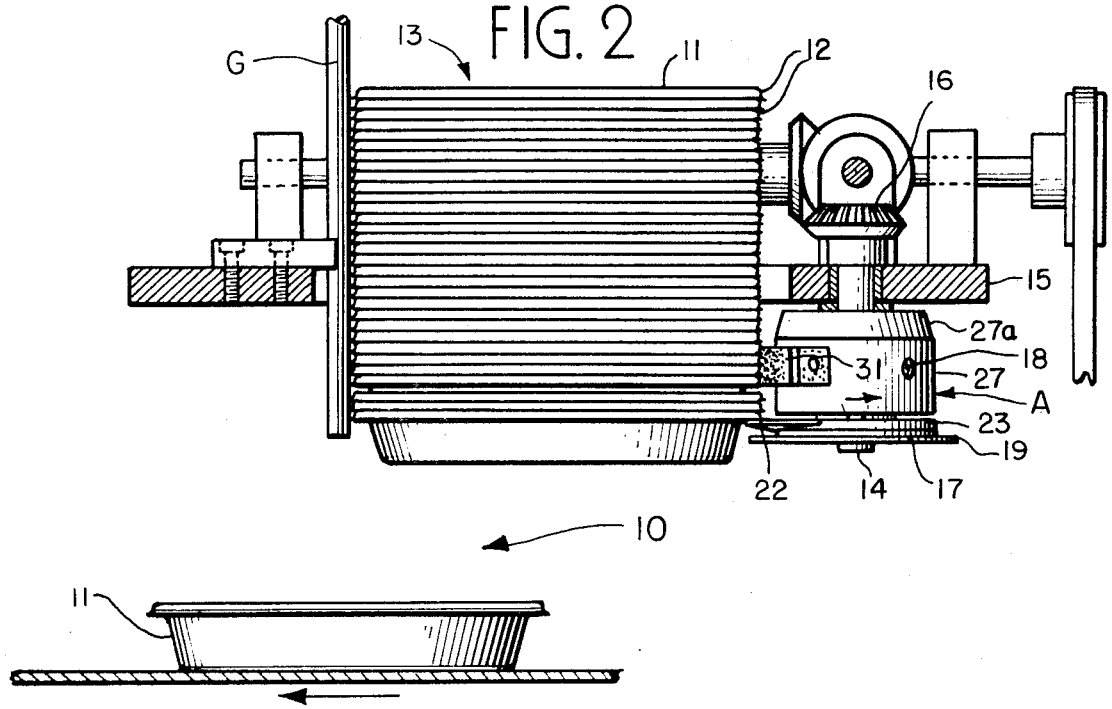

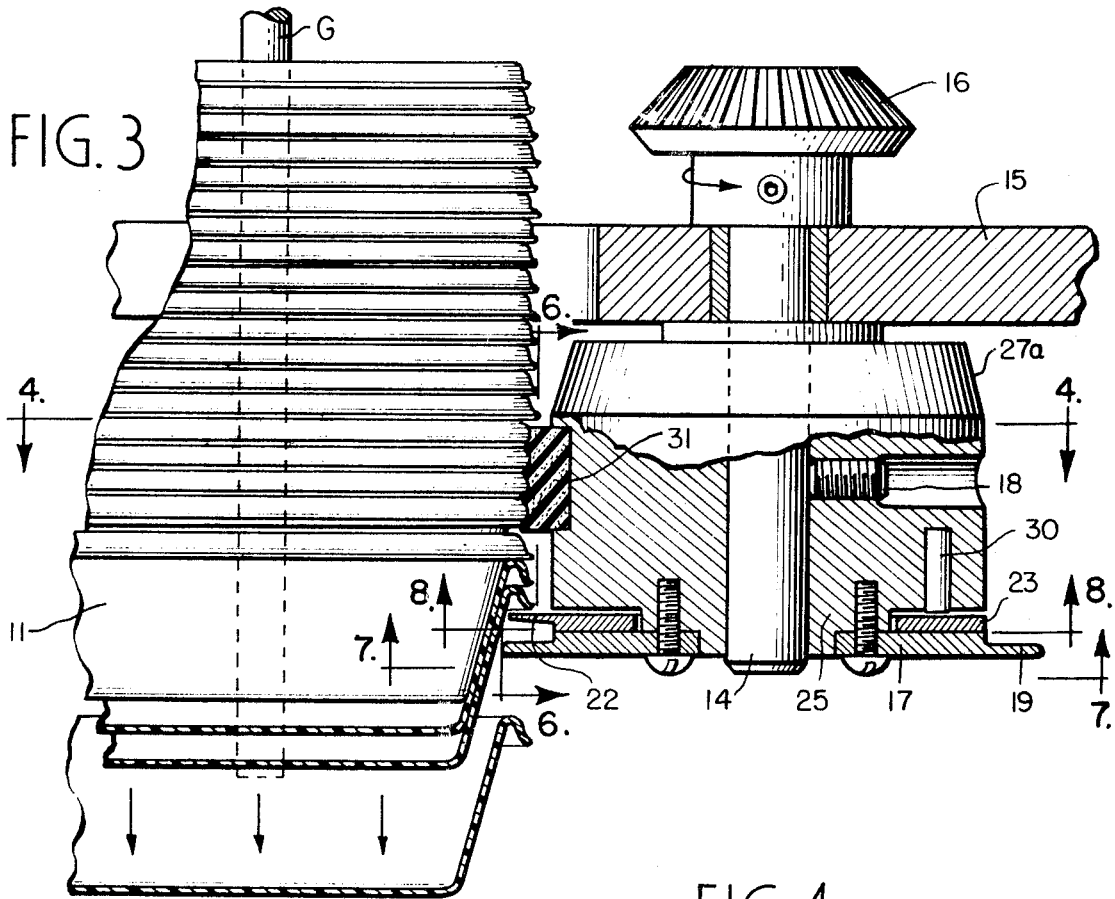
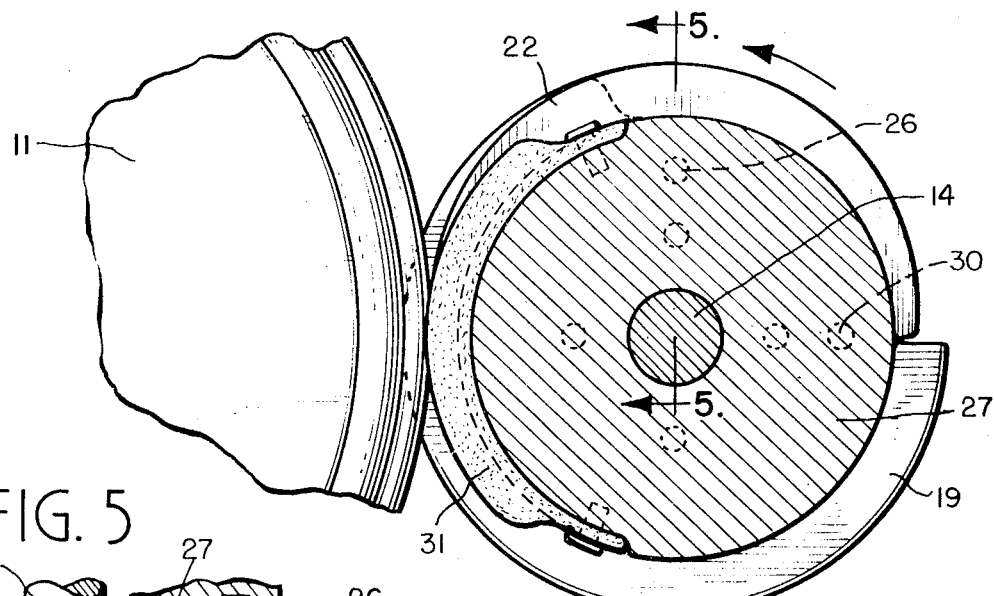
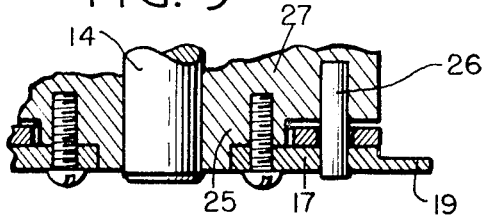

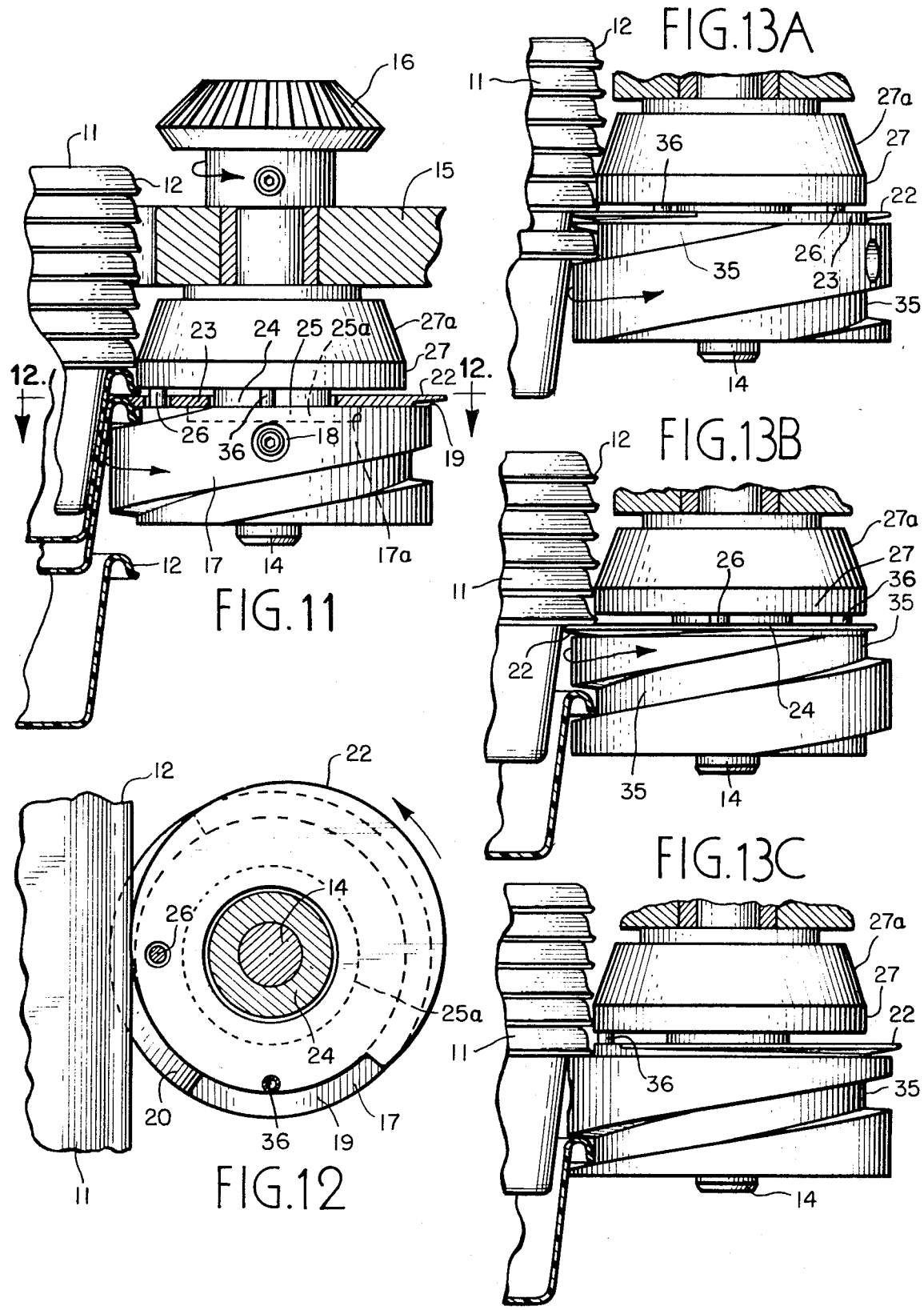

SEPARATOR

BACKGROUND OF THE INVENTION

The present invention relates to a separator unit for sequentially denesting containers of the type having an outstanding rim or bead about the upper edge thereof as an incident to transferring said containers, one at a time, along a predetermined line of fall between a stack in which said containers are in nested open end upward relation and a container depositing station with which said stack is vertically aligned.

The invention has particular, though not exclusive, utility in the handling of thin metal foil containers of the type having a curled rim or bead along its upper edge. Such containers are conveniently stored, upon manufacture, in nested fashion and fit relatively tightly in a compact stack prior to being filled or otherwise placed in service.

It has been common in former separator units to employ a pair of rotors in fixed axially aligned relation about an upright rotating shaft and rotating said rotors in unison with said shaft with the lower rotor providing a peripheral ledge in the line of fall of said containers during a partial cycle of rotation of said shaft and a gap in said ledge in the line of fall of said containers during another partial cycle of rotation of said shaft whereby the rim of the lowermost container was disengaged from a supported position on said ledge in said first partial cycle of rotation of said lower rotor. While the lowermost container of the stack of containers was thus disengaged from a supported position on said ledge of the lower rotor a blade, forming a radial extension of the upper rotor in overhead relation to said gap in the ledge of the lower rotor, exerted wedging action between the rim of said lowermost container and the rim of the next lowermost container in the stack so as to dislodge the lowermost container and thereby free the container for its descent to the container depositing station.

It has been found, however, that because of slight variations in the vertical dimension of the rims of the nested containers as well as slight variation in the nesting depths of adjacent containers in the stack that the axially fixed position of the upper rotor sometimes interfered with entry of the rotor blade into the area between the lowermost and next to lowermost containers in the stack. As a consequence the blade would sometimes act to damage the beaded rim and thereby impair its serviceability in establishing a proper seal with a cover applied to said rim as an incident to forming a closed packaging assembly. This proved to be a particularly knotty problem during high speed operation where it is desired to transfer upwards of 100 containers per minute. At these speeds the difficulty of denesting the lowermost container became more pronounced when the stack comprised a great number of nested containers, thus exacting more weight on the lower containers directly involved in the denesting process.

In addition, some containers were particularly difficult to denest and fall freely because of their tendency to stick to the next lowermost container. As a result, the container might not land upright in the container depositing station, or may not even be completely separated from the stack above until the next lowermost container was separated from the stack, resulting in two or more containers being deposited on the container depositing station in nested relationship at one time.

SUMMARY OF THE INVENTION

Accordingly it is an object of this invention to provide an improved separator unit which avoids the problem encountered in former rotor type separator units.

It is also an object of this invention to provide a separator unit of the type indicated wherein the blade of the upper rotor is coupled to the lower rotor in such manner as to allow the blade to not only move axially of the shaft toward and away from the lower rotor but to have limited tilting movement about axes extending radially of the shaft while said rotors rotate in unison with the shaft. By thus providing this floating condition of the blade in relation to the lower rotor, the blade is allowed to undergo self-adjusting action to accommodate variations in the rim dimensions as well as variations in the nesting depths of adjacent containers and thereby avoid injury to such rims of the containers.

Further facility and efficiency in transferring the containers is achieved by providing means to relieve the weight of all but a predetermined number of containers of the stack of containers from the lower containers being separated from the stack during the transfer process. In addition, where a container to be transferred has a particular tendency to stick to the containers the above means are provided to ensure complete separation of the lowermost container from the stack for free descent to the container depositing station.

These and other objects and advantages of the invention will become apparent from a further reading of the specification taken in conjunction with the drawing wherein:

DESCRIPTION OF THE DRAWINGS

FIG. 1 is a plan view showing an installation of three separator units embodying the present invention in operative relation to a stack of nested containers.

FIG. 2 is a vertical section taken along line 2—2 of FIG. 1.

FIG. 3 is an enlarged elevational view, partially cross-sectioned, of a separator unit showing control means for limiting downward rocking movement of the floating rotor blade.

FIG. 4 is a horizontal section taken along line 4—4 of FIG. 3.

FIG. 5 is a sectional view taken along line 5—5 of FIG. 4.

FIG. 11 is an elevational view of a separator unit showing a helical groove in the lower rotor to receive the rim of the lowermost container and insure complete separation thereof from the rest of the stack.

FIG. 12 is a cross-section taken along line 12—12 of FIG. 11.

FIGS. 13A, 13B and 13C respectively illustrate the positions sequentially occupied by the components of the separator unit having the helical groove during each cycle of travel relative to the stack of containers operatively associated therewith.

DETAILED DESCRIPTION OF THE INVENTION

Figure 7:
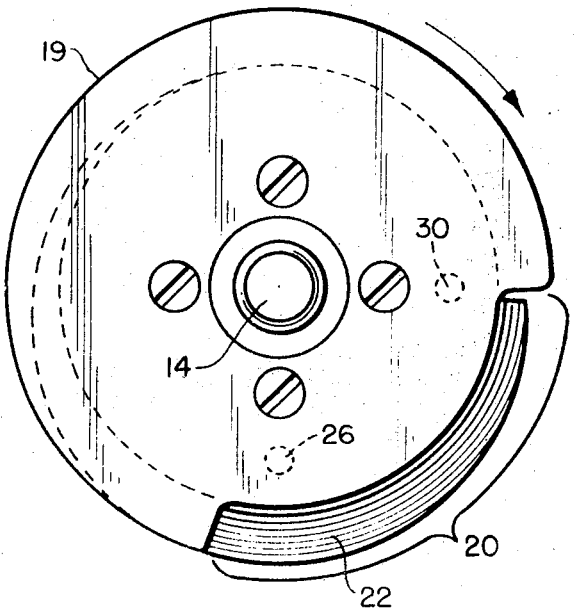
FIG. 7 is a bottom plan view of a separator unit.
Figure 8:
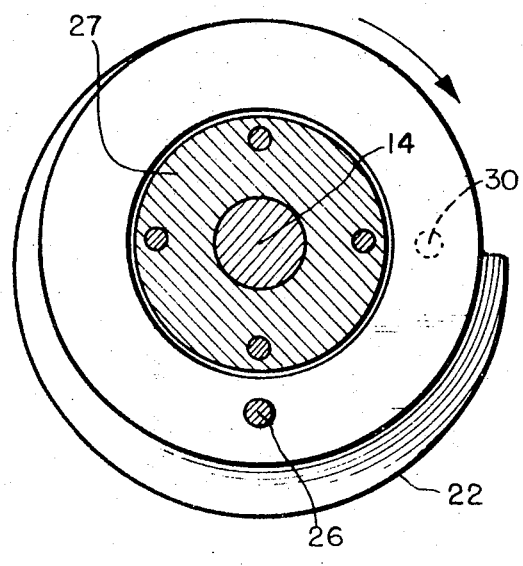
FIG. 8 is a horizontal cross-sectional view taken along line 8—8 of FIG. 3.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the invention is to cover all modifications, alternative constructions and equivalents falling within the spirit and scope of the invention as expressed in the appended claims.

With reference now more particularly to the drawings, there is shown a typical installation wherein an area 10 designates a container depositing station, (such for example as a conveyor on which a container is carried from said station to a container filling station preparatory to the production of a merchandise packaging assembly with which said container is to be associated).

Round metal foil containers 11 of conventional size and construction having a curled rim 12 along the upper edge thereof have been chosen to illustrate one example of container susceptible to denesting from a stack of like containers with the use of separating units embodying the features of this invention. To this end an area 13 extending upwardly from the container depositing station 10 is bordered by three separating units designated generally as A, B and C, said units being arranged in uniformly spaced apart relation circumferentially of a circle located centrally of area 13. The number and relative positions of such separating units will, of course, be subject to variation according to the specific shape and size conditions of the containers to which the units are operatively applied. Guides G are spaced around the circumference of said circle to aid in centrally locating the container 11 in area 13.

Each unit A, B and C includes a shaft 14 having bearing support on a fixed frame 15 for rotation about an upright axis parallel to the line of fall from the area 13 to the depositing station 10. Power rotated means having suitable transmission mechanism (not shown) connects a gear 16 fixed on shaft 14 of each unit to a power source to provide means for rotating said shafts in unison at a uniform speed. Each shaft 14 is provided with a rotor 17 secured to the shaft 14 by means of a set screw 18 whereby the rotor 17 turns in unison with the shaft 14 to which it is secured. Each rotor 17 has a circumferentially extending peripheral portion of uniform radial dimension through an arc of approximately 240 degrees to define a ledge 19 which occupies a position effective to intercept the fall of a container 11 having its rim 12 in downward engagement therewith while said ledge is in a rotated position wherein the ledge 19 faces the area 13. Each rotor 17 also is provided with a circumferentially relieved peripheral portion defining a gap 20 as best shown in FIG. 7 operative to disengage the rim 12 of the container 11 when said ledge is rotated to a second position away from said area 13 and the gap 20 faces said area whereupon said container is released and free to fall to station 10.

While the lowermost container 11 is thus being freed from engagement by the gap 20 of the rotors 17, the next lowermost container 11 of the stack has its rim 12 in downward engagement with a blade 22 defined by a radially extending wing portion of a second rotor 23 in overhead relation to the gap in rotor 17. During such engagement of the next lowermost container 11 of the stack with the blade 22, the stack of containers is in fact supported by the blade 22. Each rotor 23 has a central opening which has axially slidable as well as rotary sliding engagement with the periphery of a cylindrical neck 24 of a spacer 25 rotatably mounted on each shaft 14, as best shown in FIGS. 11, 12 and 13A, 13B and 13C. Rotor 17 has an upwardly open circular recess 17a which is occupied by the radially enlarged cylindrical base 25a of the spacer 25 associated therewith. The radial dimension of the central opening of each rotor 23 is so enlarged in relation to the radial dimension of said neck of the spacer 25 associated therewith as to not only allow relative axial sliding movement of each rotor 23 on the neck of the spacer but also to allow limited tilting movement of the rotor 23 about axes extending radially of the shaft 14 associated therewith. While thus having its axis of rotation established by its associated spacer 25, rotor 23 is prevented from rotating relative to its associated rotor 17 by means of a coupling pin 26 projecting downwardly from a third rotor 27 having downward bearing support on the upper surface of the neck of the spacer 25 positioned therebelow. The coupling pin 26 extends through axially aligned pin receiving openings in the rotor 23 and the rotor 17. As shown in FIGS. 3 and 5, the spacer may also be formed integrally with rotor 27.

It will be observed that the associated rotors 17, 23 and 27 have matching radial dimensions measured at the gap 20 in rotor 17 except for the blade 22 on each rotor 23. As shown, each rotor 27 is of such extended axial dimension as to provide an upright cylindrical surface with which rims of a number of containers 11 at the lower end of the stack has guidance so as to maintain the stack in vertical alignment centrally of the area 13 occupied by the stack of containers. A frusto conical wall portion 27a merges with the upper end of said cylindrical wall.

Each blade 22 is of gradually diminishing radial dimension in the direction of rotation of the shaft 14 associated therewith with its maximum radial dimension conforming to the radial dimension of the ledge of the rotor subjacent thereto. Thus each blade 22 progressively enters the area between the rim of the lowermost container 11 and the rim of the next lowermost container as the shaft 14 of each separator unit and the rotors associated therewith are rotated. In addition, the upwardly facing surface of each blade 22 is spirally downwardly inclined in the direction of rotation of the rotor from which the blade 22 extends whereby the blade is effective to exert progressively increasing wedging force between the rims of the lowermost and next to lowermost containers 11 of the stack as the blade 22 moves into the stacking area 13 toward a position clear of said area.

Tilting of the blade 22 downwardly under the load imposes thereon when supporting the lowermost container of the stack is limited by spacers 30 extending upwardly from an area of the rotor 23 diametrically opposite the radially widest portion of the blade 22 which has upward engagement with the surface of the upper rotor 27 opposite said spacer. Accordingly, the blade 22 is assured of a predetermined minimum axial spacing in relation to the ledge of the rotor 17 subjacent thereto without interfering with freedom of the blade to rock or tilt upwardly as such adjustment of the blade is needed to accommodate variations in the location of the container rims in relation to said path of tiling movement.

In operation, when the area 13 is occupied by a stack of containers 11 having rims 12 in vertical alignment with the ledge 19 of each rotor 17 so that the lowermost container of the stack is supported thereby, the shafts 14 are driven so as to move the blade 22 of each rotor 23 in a counterclockwise direction as indicated by arrows in FIG. 1 through an arc of rotation sufficient to intercept the line of fall of said stock toward said depositing station 10. Accordingly, the rim of the lowermost container 11 will be wedged downwardly of the rim 12 of the next lowermost container 11 while the rim 12 of the next to the lowermost container 11 will be simultaneously initially engaged by the rotors 17 and cause the container to be lowered to the surface of the ledge 19. During such action of the blade 22, the gap 20 in the rotors 17 will allow the container to fall to the container depositing station 10 therebelow while the next container undergoing support by the surface of the ledge 19 approaches the gap 20 for release of the container to the container depositing station 10.

Figure 9:
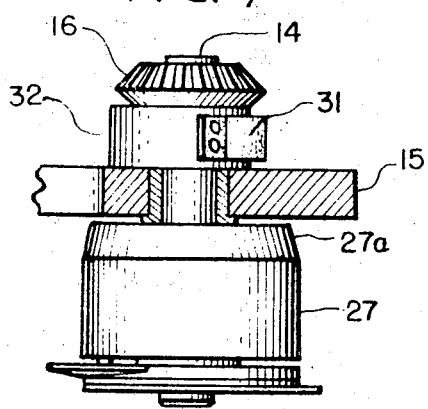
FIG. 9 is an elevational view of a separator unit showing band to engage several containers located on a separate rotor above the frame of the apparatus.
Figure 6:
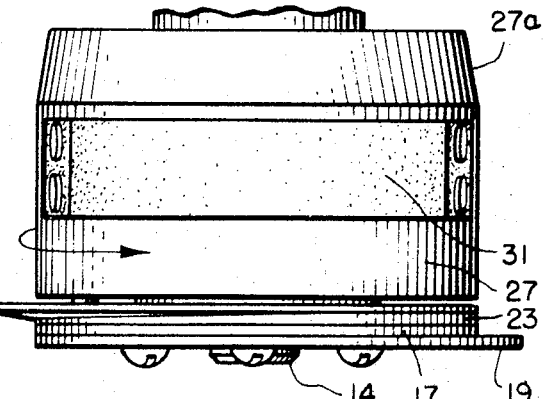
FIG. 6 is an isolated view of the separator unit shown in FIG. 3.

To further ensure faultless separation of the lowermost container from the next lowermost container there is provided means for relieving from the lowermost container the weight of all the upper containers of said stack except for a predetermined number of containers above the lowermost container while the lowermost container is being loosened from the next lowermost container by the wedging action of blade 22. Such means may include a band 31 offset outwardly from upper rotor 27 to engage the rims 12 of several containers and thereby relieve the weight of the upper containers from the lower containers. Band 31 will occupy an arc of the circumference of rotor 27 large enough to engage the rims 12 of the containers while blade 22 is engaged between the lowermost container and the next lowermost container. After the rotor 27 has rotated to a point where the container rims 12 are no longer engaged with band 31, the upper containers will drop back onto the lower containers until the rotation is repeated. If desired, band 31 may be provided on a separate rotor 32 situated above and on a common axis with rotors 17, 23 and 27 above frame 15 as shown in FIG. 9. Preferably, band 31 will be constructed of a somewhat resilient material so that enough pressure may be exerted on the rims 12 of the containers to hold the upper containers without damaging or distorting the rims.

Figure 10:
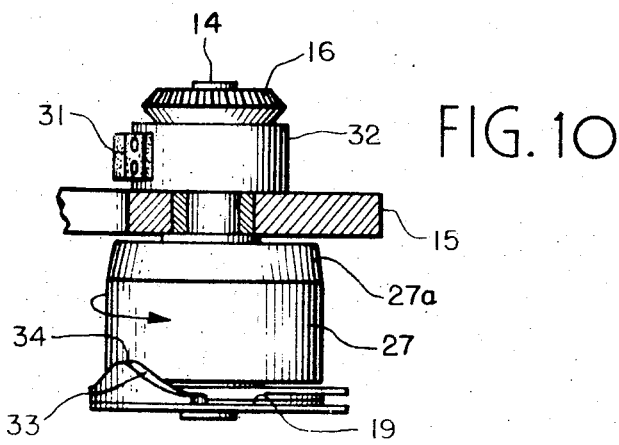
FIG. 10 is an elevational view of a separator unit as in FIG. 6, further including a ramp to elevate a stack of containers.

As a more positive means to ensure that the weight of the upper containers will be relieved from the lower containers, there may be provided on ledge 19 of rotor 17 a ramp 33 inclined upwardly in the direction of rotation of the rotor as shown in FIG. 10. Ramp 33 is positioned on ledge 19 so that rim 12 of the next lowermost container will be elevated on the ramp just prior to engagement of blade 22 with the lowermost container. Thus the upper containers will be lifted a corresponding amount and band 31 would then be positioned to begin to engage the rims 12 of several of the upper containers when the upper rim 12 of the next lowermost container has reached the highest point 34 of ramp 33 and, as described above, to disengage the rims 12 when the lowermost container has been loosened from the next lowermost container by the action of blade 22. It can easily be seen that the number of containers that will remain as the upper containers are elevated can be predetermined as desired by choosing a desired vertical distance between the blade 22 and the lower edge of band 31.

By the use of the invention, it has been found that a continuous supply of containers 11 can be successively released to the container depositing station 10 while controlling such release so that one, and only one container is removed from the stack during each cycle of revolution of the blade 22. In addition the floating action which is provided for the blade 22 permits such self-adjustment of the blade axially of the shaft associated therewith, as well as tiltably about axes extended radially of said shaft, as to prevent damage to the rims of the containers which may become skewed as an incident to frictional forces developed by the rapid removal of the containers from the stack. As seen above, bands 31 and ramps 33 on ledge 19 may be employed to relieve the weight of the stack from the lower containers during operation.

As stated earlier, some containers are difficult to denest in spite of the means employed above because of a particular tendency for the lowermost container to stick to the next lowest container. This sticking problem is most frequently encountered with plastic containers and particularly those that have flutes or other configurations in the side walls, or those that have side walls nearly vertical. It thus becomes desirable to drive the lowermost container mechanically downwardly in line with the predetermined line of fall of the containers until the lowermost container has been completely released from the next lowest container. As shown in FIGS. 11, 12 and 13A, 13B and 13C, this action may be accomplished by providing in rotor 17 a helical groove 35 in rotor 17 which will first receive the rim of the lowermost container as shown in FIG. 13A after the blade 22 has completed its separating action and the container is positioned in gap 20 of ledge 19 and then progressively drive the container downwardly by action on the rim of the container as shown in FIGS. 13B and 13C as the rotor rotates. When the rim of the container reaches the lowest point of groove 35 it is completely released from the next lowest container and it is allowed to fall freely to depositing station 10 below. Although a helical groove 35 defining a rotation of the rotor of approximately 360° has been described, it should be obvious that the length and number of rotations required for the rim of the container to travel the length of the groove could be varied depending on such factors as height and configuration of containers and the amount they tend to stick together.

When the container rims terminate in a laterally extending flange such as those shown in FIGS. 13A, 13B and 13C the rim of the container above the lowermost container is susceptible to becoming trapped between the blade 22 and upper rotor 27. To eliminate the risk of such rim being trapped, there is provided a knockout pin 36 securely disposed between the rotor 17 and the rotor 27 and extending through an opening in rotor 23. Pin 36 is located at a point near the periphery of the rotors at a point just following the trailing edge of blade 22 along the direction of rotation of the rotors.

While not shown in FIGS. 11, 12 and 13A, 13B and 13C, it should be obvious that a band 31 and ramp 33 may be employed along with the helical groove feature shown in these views.

What is claimed is:

1. A separator unit for sequentially denesting like containers each having an outwardly projecting rim at the mouth thereof while said containers are in open end upward nested relation defining an upright stack as an incident to transfer of said containers along a predetermined line of fall between said stack and a container depositing station in vertically aligned relation to said stack, said unit including a driven shaft supported for rotation in a predetermined direction about a fixed axis parallel to said stack, a first rotor secured to said shaft for rotation in unison with said shaft, a second rotor coupled to said first rotor in overhead relation to said first rotor to prevent rotation of said second rotor relative to said first rotor while allowing said second rotor to have limited movement axially of said shaft toward and away from said first rotor, and said second rotor being tiltable relative to said first rotor about axes extending radially of said shaft said first rotor having a circumferentially extending peripheral portion defining a ledge with which the rim of the lowermost pan of said stack has downward engagement to support said stack when said first rotor occupies a first rotated position wherein said ledge intercepts said line of fall between the stack and said container receiving station and said first rotor having a circumferentially relieved peripheral portion defining a gap through which the rim of the lowermost pan of the stack is disengaged from said ledge of the first rotor when said rotor occupies a second rotated position wherein said gap is in vertical alignment with said line of fall between the stack and said container receiving station, means having downward engagement with the rim of said lowermost container of the stack to loosen the container from the stack while said first rotor occupies said second rotated position and during approach to said second rotated position, said means including a blade defined by a radially extended wing portion of the second rotor in overhead relation to said gap in the periphery of the first rotor.

2. A separator unit according to claim 1 wherein said second rotor is tiltable relative to said first rotor about axes extending radially of said shaft, and spacer means acting between said first and second rotors is effective to limit downward tilting movement of the blade when said blade occupies a position in the line of fall of said containers in said stack.

3. A separator unit for sequentially denesting like containers each having an outwardly projecting rim at the mouth thereof while said containers are in open end upward nested relation defining an upright stack as an incident to transfer of said containers along a predetermined line of fall between said stack and a container depositing station in vertically aligned relation to said stack, said unit including a driven shaft supported for rotation in a predetermined direction about a fixed axis parallel to said stack, a first rotor secured to said shaft for rotation in unison with said shaft, a second rotor coupled to said first rotor in overhead relation to said first rotor to prevent rotation of said second rotor relative to said first rotor while allowing said second rotor to have limited movement axially of said shaft toward and away from said first rotor, said first rotor having a circumferentially extending peripheral portion defining a ledge with which the rim of the lowermost pan of said stack has downward engagement to support said stack when said first rotor occupies a first rotated position wherein said ledge intercepts said line of fall between the stack and said container receiving station and said first rotor having a circumferentially relieved peripheral portion defining a gap through which the rim of the lowermost pan of the stack is disengaged from said ledge of the first rotor when said rotor occupies a second rotated position wherein said gap is in vertical alignment with said line of fall between the stack and said container receiving station, means having downward engagement with the rim of said lowermost container of the stack to loosen the container from the stack while said first rotor occupies said second rotated position and during approach to said second rotated position, said means including a blade defined by a radially extended wing portion of the second rotor in overhead relation to said gap in the periphery of the first rotor, and means for relieving from said lowermost container the weight of all the upper containers of said stack except for a pre-determined number of containers immediately above said lowermost container while said lowermost container is being loosened from the next lowermost container, and said ledge of said first rotor including a ramp inclined upwardly in the direction of rotation of said rotor, said ramp portion being located between said first rotated position of said rotor and said second rotated position of said rotor, said weight relieving means being positioned to begin to engage said rims of said containers when the lowermost container of the upper containers reaches the highest point on said inclined portion of said ledge and to disengage said rims when said lowermost container has been loosened from said next lowest container.

4. A separator unit according to claim 3 wherein said first rotor includes a helical groove to receive said rim of said lowermost container to drive said lowermost container downwardly in line with said predetermined line of fall until said lowermost container has been completely released from said next lowest container.

5. A separator unit according to claim 3 wherein said weight relieving means includes a separate rotor situated above said first, second and third rotors and on a common axis therewith, and said band is offset outwardly from said separate rotor.

6. A separator unit for sequentially denesting like containers each having an outwardly projecting rim at the mouth thereof while said containers are in open end upward nested relation defining an upright stack as an incident to transfer of said containers along a predetermined line of fall between said stack and a container depositing station in vertically aligned relation to said stack, said unit including a driven shaft supported for rotation in a predetermined direction about a fixed axis parallel to said stack, a first rotor secured to said shaft for rotation in unison with said shaft, a second rotor coupled to said first rotor in overhead relation to said first rotor to prevent rotation of said second rotor relative to said first rotor while allowing said second rotor to have limited movement axially of said shaft toward and away from said first rotor, said first rotor having a circumferentially extending peripheral portion defining a ledge with which the rim of the lowermost pan of said stack has downward engagement to support said stack when said first rotor occupies a first rotated position wherein said ledge intercepts said line of fall between the stack and said container receiving station and said first rotor having a circumferentially relieved peripheral portion defining a gap through which the rim of the lowermost pan of the stack is disengaged from said ledge of the first rotor when said rotor occupies a second rotated position wherein said gap is in vertical alignment with said line of fall between the stack and said container receiving station, means having downward engagement with the rim of said lowermost container of the stack to loosen the container from the stack while said first rotor occupies said second rotated position and during approach to said second rotated position, said means including a blade defined by a radially extended wing portion of the second rotor in overhead relation to said gap in the periphery of the first rotor, and means for relieving from said lowermost container the weight of all the upper containers of said stack except for a pre-determined number of containers immediately above said lowermost container while said lowermost container is being loosened from the next lowermost container, and a third rotor located above and on a common axis with said first rotor and said second rotor, and a knockout pin disposed between said first rotor and said third rotor at a point near the periphery of said rotors just following the trailing edge of said blade to prevent said rim of said container from being trapped between said blade and said third rotor.

7. A separator unit according to claim 6 wherein said first rotor includes a helical groove to receive said rim of said lowermost container to drive said lowermost container downwardly in line with said predetermined line of fall until said lowermost container has been completely released from said next lowest container.

8. A separator unit for sequentially denesting like containers each having an outwardly projecting rim at the mouth thereof while said containers are in open end upward nested relation defining an upright stack as an incident to transfer of said containers along a predetermined line of fall between said stack and a container depositing station in vertically aligned relation to said stack, said unit including a driven shaft supported for rotation in a predetermined direction about a fixed axis parallel to said stack, a first rotor secured to said shaft for rotation in unison with said shaft, a second rotor coupled to said first rotor in overhead relation to said first rotor to prevent rotation of said second rotor relative to said first rotor while allowing said second rotor to have limited movement axially of said shaft toward and away from said first rotor, said first rotor having a circumferentially extending peripheral portion defining a ledge with which the rim of the lowermost pan of said stack has downward engagement to support said stack when said first rotor occupies a first rotated position wherein said ledge intercepts said line of fall between the stack and said container receiving station and said first rotor having a circumferentially relieved peripheral portion defining a gap through which the rim of the lowermost pan of the stack is disengaged from said ledge of the first rotor when said rotor occupies a second rotated position wherein said gap is in vertical alignment with said line of fall between the stack and said container receiving station, means having downward engagement with the rim of said lowermost container of the stack to loosen the container from the stack while said first rotor occupies said second rotated position and during approach to said second rotated position, said means including a blade defined by a radially extended wing portion of the second rotor in overhead relation to said gap in the periphery of the first rotor, and a third rotor located above and on a common axis with said first rotor and said second rotor and a knockout pin disposed between said 1st rotor and said third rotor at a point near the periphery of said rotors just following the trailing edge of said blade to prevent said rim of said containers from being trapped between said blade and said third rotor.

* * * * *